United States Patent [19]

Kitada

[11] Patent Number: 5,093,783
[45] Date of Patent: Mar. 3, 1992

[54] MICROCOMPUTER REGISTER BANK ACCESSING

[75] Inventor: Yoshitaka Kitada, Tokyo, Japan

[73] Assignee: NEC Corporation, Tokyo, Japan

[21] Appl. No.: 761,892

[22] Filed: Aug. 2, 1985

[30] Foreign Application Priority Data

Aug. 2, 1984 [JP] Japan .................. 59-163061

[51] Int. Cl.[5] .................. G06F 12/00; G06F 12/06
[52] U.S. Cl. .................. 395/400; 364/254; 364/254.2; 364/255.1; 364/255.8; 364/256.2; 364/261; 364/261.2; 364/DIG. 1
[58] Field of Search .............. 364/200, 900, 705-710, 364/760; 354/472; 370/62-84

[56] References Cited

U.S. PATENT DOCUMENTS

| | | | |
|---|---|---|---|
| 3,380,034 | 4/1968 | Cerny | 364/200 |
| 3,395,392 | 7/1968 | Kulikauskas et al. | 364/200 |
| 3,737,860 | 7/1973 | Sporer | 364/200 |
| 3,866,182 | 2/1975 | Yamada et al. | 364/200 |
| 3,946,366 | 3/1976 | Edwards, Jr. | 364/200 |
| 4,124,891 | 11/1978 | Weller, III et al. | 364/200 |
| 4,223,381 | 9/1980 | Rozell et al. | 364/200 |
| 4,383,296 | 5/1983 | Sander | 364/200 |
| 4,394,735 | 7/1983 | Watanabe | 364/200 |
| 4,573,116 | 2/1986 | Ong et al. | 364/200 |
| 4,615,004 | 9/1986 | Chevillat et al. | 364/200 |
| 4,615,018 | 9/1986 | Sakano | 364/900 |
| 4,755,931 | 7/1988 | Abe | 364/200 |

*Primary Examiner*—Gareth D. Shaw
*Assistant Examiner*—Paul Kulik
*Attorney, Agent, or Firm*—Foley, Lardner, Schwartz, Jeffery, Schwaab, Mack, Blumenthal & Evans

[57] ABSTRACT

The microcomputer has a plurality of register banks, each having a plurality of registers for containing data therein, a bank address register for holding the address of one of the register banks to be accessed and an access control circuit responsive to a bank address signal for putting one of said register banks in accessible condition. Part of the instruction code is utilized to modify the output of the bank address register during a portion of the execution cycle to permit single instruction transfer or arithmetic operations between plural memory banks.

15 Claims, 3 Drawing Sheets

MICROCOMPUTER REGISTER BANK ACCESSING

BACKGROUND OF THE INVENTION

The present invention relates to a microcomputer including a plurality of register banks, of which any one bank is designated by means of a bank address register for processing data stored therein.

General purpose registers are widely employed for arithmetic calculation and comparing processing in the microcomputer, and thus the microcomputer must be equipped with a plurality of general purpose registers for storing therein the results of a variety of processings or data to be processed.

The microcomputer actually employed comprises a plurality of register banks, each consisting of a series of general purpose registers. Any one of the register banks is selected by means of a bank address register for each processing to be executed. In such a microcomputer, it is easy to execute a processing of data in the same register bank. For example, in case the contents in the registers A and B of the register bank 0 should be added with each other and the result should be stored in the register A or the register bank 0, the address of the register bank 0 is set in the bank address register and then an instruction for adding the content of the register A with that of the register B is executed. In case the content of the register A of the register bank 0 is to be added with that of the register B of the register bank 1 and that the result is to be stored in the register A of the register bank 0, however, the processing has to be executed by a plurality of instructions, because two different register banks cannot be accessed at the same time during the execution of one instruction. That is, in a first instruction, the bank register 1 is accessed by setting the address of the register bank 1 in the bank address register to transfer the content of the register B of the register bank 1 to a memory. With another instruction, the bank register 0 is accessed by setting the address of the register bank 0 in the bank address register to add the content of the register A of the register bank 0 with the content stored in the memory.

Such a complicated processing was conducted not only in arithmetic processing but also in the case of frequently transferred data. Namely, the processing of the data stored in different register banks has had to be accompanied with the transfer of data via memory.

Accordingly, the processing of the data stored in different register banks was complicated and required numerous programming steps. Thus, the execution time for such a processing was prolonged.

SUMMARY OF THE INVENTION

It is a main object of the present invention to provide a microcomputer which can execute data processing between different register banks at a high speed.

It is another object of the present invention to provide a microcomputer which can process data stored in different register banks by the execution of only one instruction.

According to the present invention, there is provided a microcomputer which includes a plurality of register banks each consisting of a plurality of registers for containing data therein, a bank address register for holding the address of one of said register banks to be accessed and access control means responsive to a bank address signal for putting one of said register banks in accessible condition, said microcomputer comprising:

a logic gate circuit receiving at one input at least one bit of the address held in the bank address register and at another input a predetermined portion of the code of an instruction to be executed by the microcomputer and for modifying the inputted bit of the bank address; and a selection means for selecting any one of the modified bit and the non-modified bit of the bank address and outputting the selected bit as at least a portion of the bank address signal to said access control means.

According to an embodiment of the present invention, the logic gate circuit comprises, for example, an OR gate.

According to another embodiment of the present invention, the logic gate circuit comprises a first OR gate receiving at one input the least significant bit of the address (which is preferably coded in 2 bit length) held in the bank address register and at another input the least significant bit of the code of an instruction to be executed by the microcomputer and a second OR gate receiving at one input the most significant bit of the address held in the bank address register and at another input the least significant bit of the code of the instruction to be executed by the microcomputer.

According to a preferred embodiment of the present invention, the selection means comprises a first selection circuit receiving the output of the first OR gate and the least significant bit of the address held in the bank address register and for selecting any one thereof, and a second selection circuit receiving the output of the second OR gate and the most significant bit of the address held in the bank address register and for selecting any one thereof.

According to a still further preferred embodiment of the present invention, the first and second selection circuits are responsive to the variation of a timing signal to select one of the inputted signals.

According to a still further embodiment of the present invention, the logic gate circuit is constituted by an Exclusive OR gate receiving at one input the least significant bit of the address held in the bank address register and at another input the least significant bit of the code of an instruction to be executed by the microcomputer.

BRIEF DESCRIPTION OF THE DRAWINGS

Other characteristics and advantages of the present invention will be understood clearly from the description of the examples which will be made with reference to the accompanying drawings in which.

DESCRIPTION OF THE PREFERRED EMBODIMENTS

Figure 1:
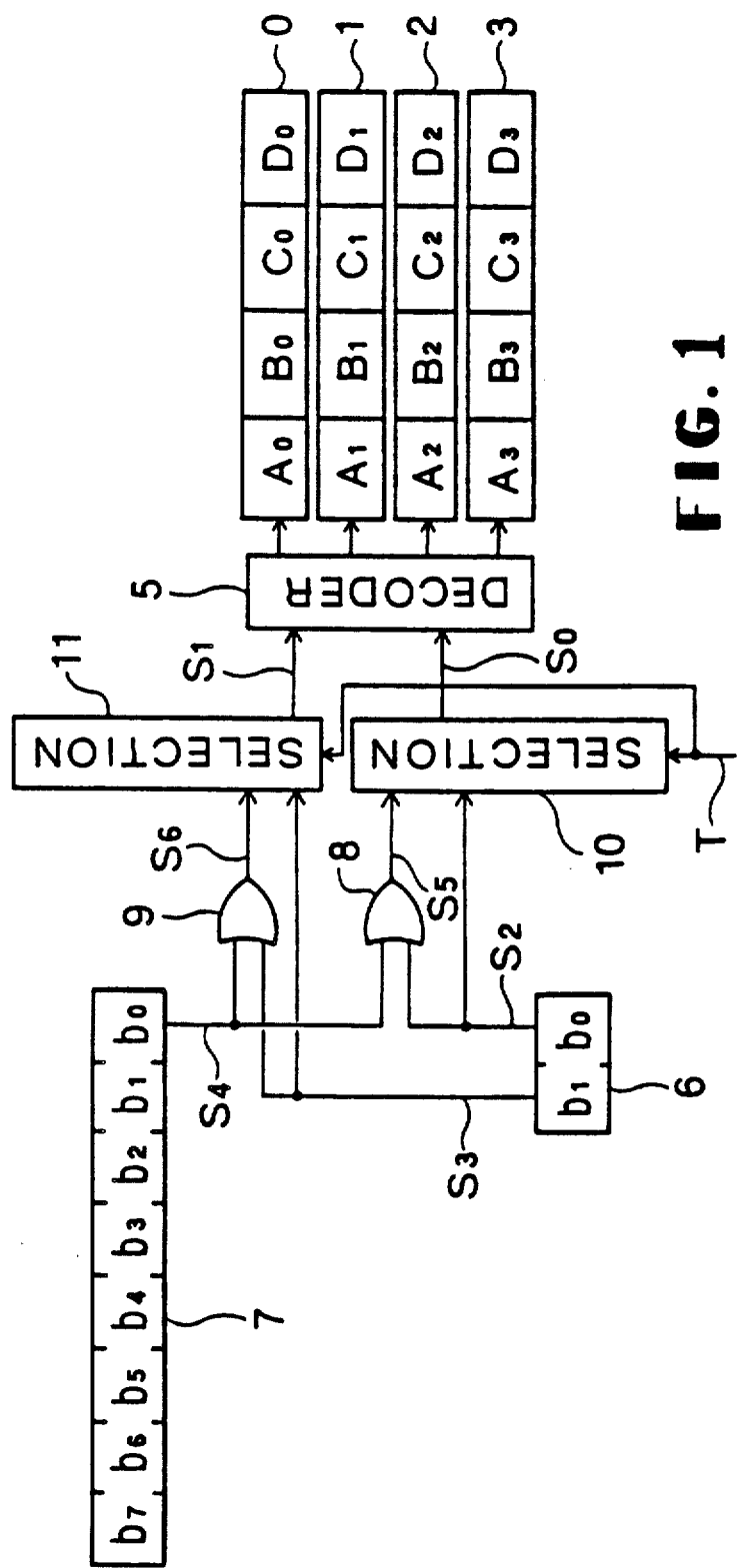
FIG. 1 is a block diagram of the first example of the microcomputer embodying the present invention.

The microcomputer shown in FIG. 1 comprises registers arrayed in a matrix form of four rows and four columns.

Each row of the register matrix constitutes a register bank 0 to 3. That is, the register bank 0 includes registers $A_0$, $B_0$, $C_0$ and $D_0$. The register bank 1 includes registers $A_1$, $B_1$, $C_1$ and $D_1$. The register bank 2 includes register $A_2$, $B_2$, $C_2$ and $D_2$, and the register bank 3 includes registers $A_3$, $B_3$, $C_3$ and $D_3$.

The microcomputer is equipped with an access control means or decoder 5. The decoder 5 receives bank designating signals $S_0$ and $S_1$ and puts any one of the register banks 0 to 3 in accessible condition according to the combination of the bank designating signals $S_0$ and $S_1$ as shown in Table 1.

TABLE 1

| Bank designating signal | | Register bank to be |
|---|---|---|
| $S_0$ | $S_1$ | Designated |
| 0 | 0 | 0 |
| 0 | 1 | 1 |
| 1 | 0 | 2 |
| 1 | 1 | 3 |

The construction of the decoder 5 is well known in the art and thus it will not be further explained.

The microcomputer further comprises a bank address register 6 and an instruction register 7.

In this example, the bank address register 6 has a two bit length for storing the address of the register bank to be accessed. The bank address register 6 is set at "00" for designating the register bank 0, "01" for the register bank 1, "10" for the register bank 2, and "11" for the register bank 3.

The instruction register 7 is a memory circuit for storing therein the code of a certain instruction to be executed by the microcomputer. In this example, the instruction register has an eight bit length. In this example, the instruction code of the first transfer instruction for transferring the data contained in the register B to the register A in the same register bank is expressed as "10011000". On the other hand, the instruction code of the second transfer instruction for transferring the data from register B to register A in the same register bank or between different register banks is "10011001". Namely, the instruction code of the second transfer instruction is obtained by adding "1" to the least significant bit of the instruction code of the first transfer instruction.

The microcomputer comprises first and second OR gates 8 and 9. The first OR gate 8 receives signals $S_2$ and $S_4$ which are respectively the contents $b_0$ stored in the least significant bit of the bank address register 6 and the instruction register 7. The first OR gate 8 outputs a logical sum signal $S_5$ of the signals $S_2$ and $S_4$. The second OR gate 9 receives a signal $S_3$ which is the content $b_1$ stored in the most significant bit of the bank address register 6 and the signal $S_4$ which is the content $b_0$ stored in the least significant bit of the instruction register 7. The second OR gate 9 makes a logical sum of these signals $S_3$ and $S_4$ and outputs it as a signal $S_6$.

The microcomputer comprises a pair of selection circuits 10 and 11. The first selection circuit 10 receives at its inputs the signal $S_2$ which is the content held in the least significant bit of the bank address register 6 and the logical sum signal $S_5$. The first selection circuit 10 receives at its third input a timing signal T, and outputs either one of the signals $S_2$ and $S_5$ as the signal $S_0$ in response to the variation of the timing signal T. That is, when the timing signal T is at higher level "1" which means the timing to read out the data in the register B, the first selection circuit 10 selects the logical sum signal $S_5$ as the output signal $S_0$, while, when the timing signal T is at lower level "0" which means the timing to write the data in the register A, the first selection circuit 10 selects the signal $S_2$ as the output signal $S_0$. The second selection circuit 11 also receives the signal $S_3$ which is the content $b_1$ held in the most significant bit of the bank address register 6 and the logical sum signal $S_6$. The second selection circuit 11 receives also at its third input the timing signal T. When the timing signal T is "1", the second selection circuit 11 selects and outputs the logical sum signal $S_6$, while, when the timing signal T is "0", it selects and outputs the signal $S_3$ as its output signal $S_1$.

The relation between the timing signal T and the bank designating signals $S_0$ and $S_1$ is illustrated in Table 2.

TABLE 2

| | Timing signal T | Bank designating signal $S_0$ | Bank designating signal $S_1$ |
|---|---|---|---|
| Read | 1 | $S_5$ | $S_6$ |
| Write | 0 | $S_2$ | $S_3$ |

With these bank designating signals $S_0$ and $S_1$, the access control means 5 selects one of the register banks 0 to 3. The selected register bank is made accessible through an interface means (not shown) to, for example, an arithmetic logic unit.

The operation of the microcomputer shown in FIG. 1 will be now explained.

(1) A first transfer instruction may, for example, effect transfer of the data in the register $B_0$ of the register bank 0 to the register $A_0$ of the register bank 0.

For executing this instruction, the bank address register 6 is set to "00", while the instruction register 7 is set to "10011000". The signal $S_4$ which is the least significant bit of the instruction register 7 is then "0". Thus, the first and second OR gates 8 and 9 output respectively as the logical sum signals $S_5$ and $S_6$ the signals $S_2$ and $S_3$ which are the contents of the bits $b_0$ and $b_1$ of the bank address register 6. That is, the first and second OR gates 8 and 9 do not modify the address designated by the bank address register 6.

When the timing signal T is "1" which corresponds to the timing of read, the first and second selection circuits 10 and 11 output respectively the logical sum signals $S_5$ and $S_6$, which are now equal to the signals $S_2$ and $S_3$. Thus, the signals $S_2$ and $S_3$ are inputted as the bank designating signals $S_0$ and $S_1$ to the decoder 5 and then the decoder 5 puts a register bank having an address "00" in accessible condition. Accordingly, the register bank 0 is selected and the data contained in the register $B_0$ is read out.

Next, when the timing signal becomes to the lower level "0", the first and second selection circuits 10 and 11 select respectively the signals $S_2$ and $S_3$ which are the contents of the bits $b_0$ and $b_1$ of the bank address register 6. Accordingly, the access control means or decoder 5 are inputted with the signals $S_2$ and $S_3$ as the bank designating signals $S_0$ and $S_1$ and selects the register bank 0. Thus, the data read out from the register $B_0$ of the register bank 0 is written in the register $A_0$ of the register bank 0.

As explained above, the data is transferred from the register $B_0$ of the register bank 0 to the register $A_0$ of the register bank 0.

(2) A second transfer instruction may effect transfer of the data stored in the register $B_3$ of the register bank 3 to the register $A_0$ of the register bank 0.

In this case, the bank address register 6 is set to "00" and the instruction register 7 is set to "10011001". Then, the signal $S_4$ which is the least significant bit of the instruction register 7 is "1". The first and second OR gates 8 and 9 are inputted with "1" at one input thereof to thereby output "1" as the logical sum signals $S_5$ and $S_6$ regardless of the other inputs which are the contents held in the bits $b_0$ and $b_1$ of the bank address register 6.

When the timing signal T is "1", the first and second selection circuits 10 and 11 output respectively the logical sum signals $S_5$ and $S_6$ as the bank designating signals $S_0$ and $S_1$, which are now "1". Thus, with these designating signals $S_0$ and $S_1$, the access control means 5 selects the register bank 3 of which the address is "11". Accordingly, the data stored in the register $B_3$ of the register bank 3 is read out.

Next, when the timing signal T is "0", the first and second selection circuits 10 and 11 select respectively the signals $S_2$ and $S_3$ which are the contents held in the bits 0 and 1 of the bank address register 6, which are "0" in this case. Thus, the access control means 5 selects the register bank having the address held in the bank address register 6, which is in this case the register bank 0. Accordingly, the data which has been read from the register $B_3$ of the register bank 3 is written in the register $A_0$ of the register bank 0.

As readily understood from the above, the data transfer from the register $B_3$ of the register bank 3 to the register $A_0$ of the register bank 0 can be executed by only one instruction.

In this example, with the transfer instruction of "10011001", the data stored in the register belonging to the register bank 3 is read and transferred. On the other hand, the register bank to which the data is to be transferred can be designated by setting its address in the bank address register 6. That is, the data can be transferred to the register belonging to any one of the register banks 0 to 3 by setting the address thereof in the bank address register 6.

Although the data transfer has been explained in the above, the add instruction can be executed in the similar manner with the data stored in different register banks.

The code of the first add instruction ordering that the data stored in the registers A and B of the same register bank are added with each other and the result is to be stored in the register A is expressed for example as "01011000". On the other hand, the code of the second add instruction for executing an addition of the data stored in the same register bank or different register banks is expressed as "01011001".

When the bank address register 6 is set to "00", the first add instruction is executed by, first, reading the data stored in the register $B_0$ of the register bank 0, and reading the data stored in the register $A_0$ of the register bank 0, adding these data with each other and storing the result in the register $A_0$ of the register bank 0. The second add instruction is executed by reading the data stored in the register $B_3$ of the register bank 3 and then the data stored in the register $A_0$ of the register bank 0, adding these data with each other and storing the result in the register $A_0$ of the register bank 0.

As seen from the above, the addition of the data stored in the registers belonging to the register banks 0 and 3 can be executed by one instruction.

Further by changing the polarity of the timing signal T, the direction of the data transfer can be changed. That is, when the polarity of the timing signal T is inverted so that the timing signal T is at a lower level "0" when the data in the register B is to be read and the timing signal T is at higher level "1" when the data is to be written in the register A, the transfer of data is conducted in an opposite direction to that in the above explained cases. In more detail, when the bank address register 6 is set to "00", the data is transferred from the register $B_0$ of the register bank 0 to the register $A_0$ of the register bank 0 in the execution of the first transfer instruction. In the second transfer instruction, the data is transferred from the register $B_0$ of the register bank 0 to the register $A_3$ of the register bank 3.

Figure 2:
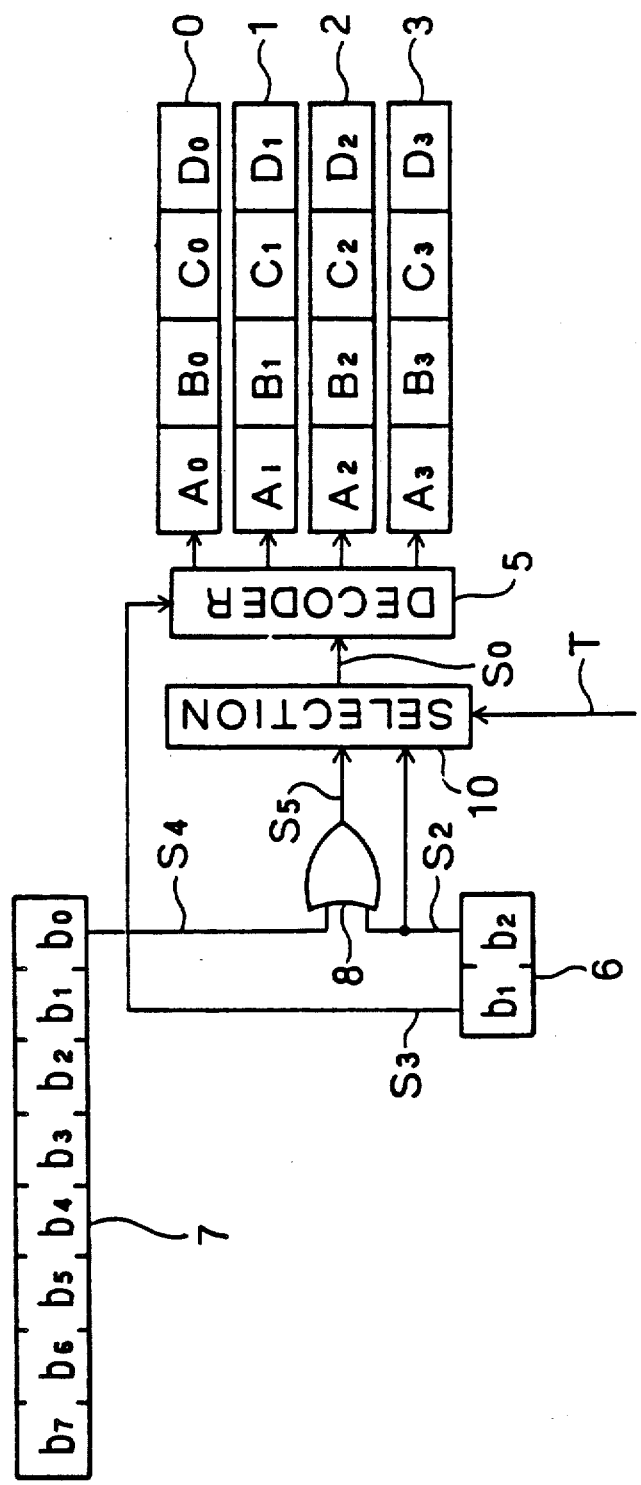
FIG. 2 is a block diagram of the second example of the microcomputer embodying the present invention.

FIG. 2 shows another embodiment of the present invention. The microcomputer shown in FIG. 2 is designed for the data processing in a same register bank or between the register banks 0 and 1 or between the register banks 2 and 3. Thus, the computer shown in FIG. 2 has a similar construction as that shown in FIG. 1 except that the signal $S_3$, that is, the content held in the most significant the bit of the bank address register 6, is directly inputted to the access control means 5. Namely, the computer shown in FIG. 2 does not include the second OR gate 9 nor the second selection circuit 11 shown in FIG. 1.

In this example, only the content held in the least significant bit of the bank address register 6 may be modified by means of the OR gate 8. When the timing signal T is "0", the selection circuit 10 outputs the signal $S_2$ which is the content held in the least significant bit of the bank address register 6. When the timing signal T is "1", the selection circuit 10 outputs the signal $S_5$ which has been obtained by modifying the signal $S_2$ by the OR gate 8.

Thus, the computer shown in FIG. 2 operates as follows:

In the case of a first data transfer instruction which transfers data within the same register bank, the instruction code is "10011000". Then, the signal $S_4$, which is the least significant bit of the instruction register 7, is "0". The OR gate 8 outputs the signal $S_2$ without modifying the same. Thus the bank designating signal $S_0$ outputted from the selection circuit 10 is equal to the signal $S_2$ regardless of the variation of the timing signal T. The access control means 5 always selects the same register bank as that designated by the bank address register 6. Accordingly, with the first data transfer instruction, the data are transferred between the registers belonging to a same register bank.

On the other hand, in the case of the second data transfer instruction, the instruction code is, for example, "10011001". Then, the signal $S_4$ of "1" is inputted to an input of the OR gate 8 which, in return, outputs the signal $S_5$ of "1" to the selection circuit 10 by modifying the signal $S_2$. Thus, when the bank address register 6 is set to "00" or "10", the OR gate 8 modifies the signal $S_2$ to "1". Accordingly, at the upper level "1" of the timing signal T, the selection circuit 10 selects the signal $S_5$ and thus the access control means 5 designates a register bank having an address of "01" or "11".

At the lower level "0" of the timing signal T, the selection circuit 10 selects the signal $S_2$ as the bank designating signal $S_0$ which is now "0" and then the access control means 5 selects the same register bank as designated by the bank address register 6. That is, when the bank address register is set to "00" or "10", the data transfer is executed between the register banks 0 and 1 or between the register banks 2 and 3. On the other hand, when the bank register 6 is set to "01" or "11", the OR gate 8 outputs the signal $S_2$ as it is. That is, the data transfer is executed in a same register bank, even with the second data transfer instruction.

Figure 3:
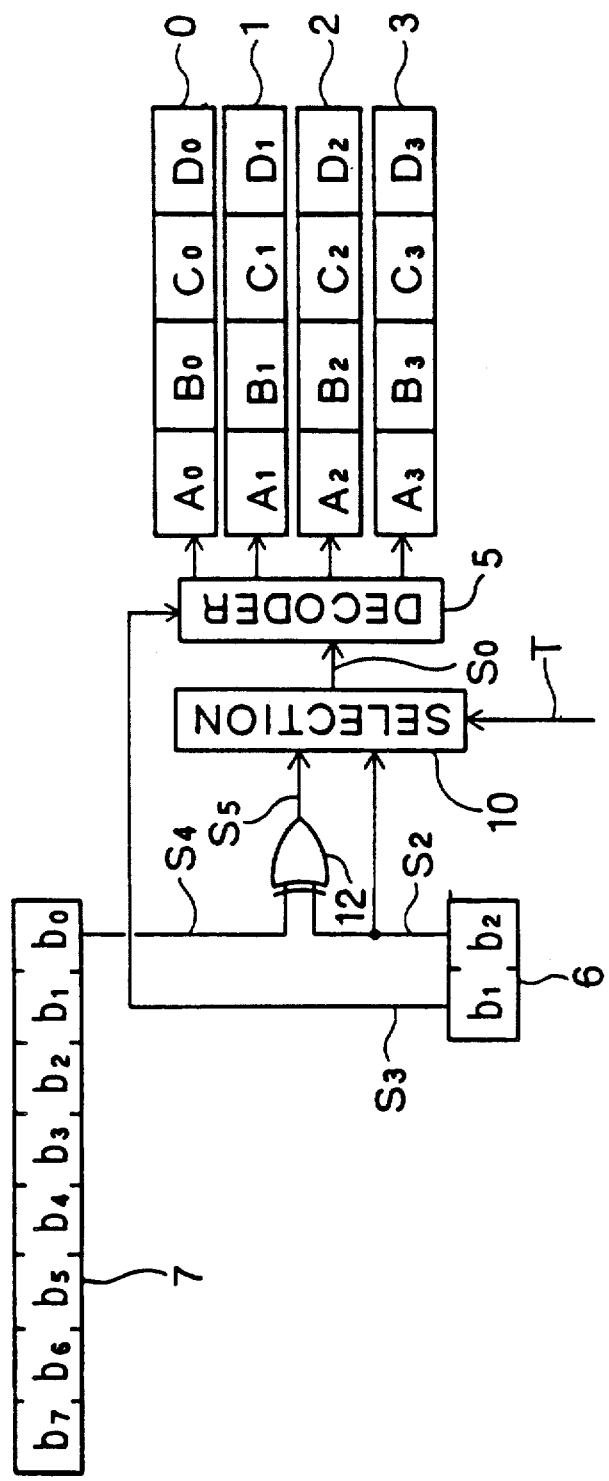
FIG. 3 is a block diagram of the third example of the microcomputer embodying the present invention.

FIG. 3 illustrates the third embodiment of the present invention. The microcomputer shown in FIG. 3 has the same construction as that shown in FIG. 2 except that an Exclusive OR gate 12 is employed in lieu of the OR gate 8.

In the case of the first data transfer instruction of which the code is "10011000", the first input $S_4$ of the Exclusive OR gate 12 is "0" and thus the Exclusive OR gate 12 does not modify the another input signal $S_2$. Accordingly, the data transfer is executed in a same register bank.

On the other hand, in the case of the second data transfer instruction of which the code is "10011001", the signal $S_4$ is "1". Thus the Exclusive OR gate 12 modifies the another input signal $S_2$ and outputs it as the signal $S_5$. When the bank address register 6 is set to "00", the Exclusive OR gate 12 outputs the signal $S_5$ of "1". At the upper level "1" of the timing signal T, the selection circuit 10 selects the signal $S_5$ as the bank designating signal $S_0$ and thus, with the inputs of $S_5$ and $S_3$ which are respectively "1" and "0", the access control means 5 designates the register bank 1. At the lower level "0" of the timing signal T, the selection circuit 10 selects the signal $S_2$ which is now "0", and the access control means 5 selects the register bank 0. Thus, the data is transferred from a register of the register bank 1 to a register of the register bank 0.

On the other hand, with the second data transfer instruction, the bank address register 6 is set to "01", and the data is transferred from a register of the register bank 0 to a register of the register bank 1. That is, in this example, the register banks 0 and 1 constitute a pair of register banks between which data can be transferred.

Further, the same result can be obtained when the bank address register 6 is set to "10" and "11". That is, the register banks 2 and 3 constitute a pair of register banks between which data can be transferred.

As explained above, in the microcomputer according to the present invention, the transfer or processing of the data between different register banks can be executed by only one instruction. Accordingly, the program steps can be largely reduced and the data processing can be executed at a high speed.

Although the present invention has been described in its preferred forms by way of examples, it is understood that changes and variations may be made without departing from the spirit or scope defined by the attached claims.

Although the above examples have been illustrated with a bank register of two bit length and an instruction register of eight bit length, these registers may have other bit lengths. Further, the number of the logical gates and the selection circuits is not restricted to those described in the examples.

I claim:

1. A microcomputer which includes a plurality of register banks each consisting of a plurality of registers for containing data therein, a bank address register for holding an address of one of said register banks to be accessed and access control means responsive to a bank address signal for putting one of said register banks in accessible condition, said microcomputer comprising:

a logic gate circuit receiving at one input at least one bit of said address held in said bank address register and at another input a predetermined portion of a code of an instruction to be executed by said microcomputer and for modifying said at least one input bit of said bank address to produce at least one modified bit; and a selection circuit receiving any one of said at least one modified bit and at least one non-modified bit of said bank address for outputting, as at least a portion of said bank address signal to said access control means, said at least one modified bit when a logic signal for alternately designating data writing and data reading for said register banks by two different logic levels complementary to each other is at one logic level of said two logic levels and said at least one non-modified bit when said logic signal is at another logic level of said two levels.

2. A microcomputer which includes a plurality of register banks each consisting of a plurality of registers for containing data therein, a bank address register for holding an address of one of said register banks to be accessed and access control means responsive to a bank address signal for putting one of said register banks in accessible condition, said microcomputer comprising:

a logic gate circuit receiving at one input at least one bit of an address held in said bank address register and at another input a predetermined portion of a code of an instruction to be executed by said microcomputer and for modifying at least one input bit of said bank address to produce at least one modified bit; and a selection circuit receiving any one of said at least one modified bit and at least one non-modified bit of said bank address for outputting, as at least a portion of said bank address signal to said access control means, said at least one modified bit when a logic signal for alternately designating data writing and data reading for said register banks by two different logic levels complementary to each other is at one logic level of said two logic levels and said at least one non-modified bit when said logic signal is at another logic level of said two levels; and wherein said logic gate circuit is constituted by an OR gate.

3. A microcomputer as claimed in claim 2, wherein the address of the register bank is expressed in two bits.

4. A microcomputer which includes a plurality of register banks each consisting of a plurality of registers for containing data therein, a bank address register for holding the address of one of said register banks to be accessed and access control means responsive to a bank address signal for putting one of said register banks in accessible condition, said microcomputer comprising:

a logic gate circuit receiving at one input at least one bit of the address held in the bank address register and at another input a predetermined portion of a code of an instruction to be executed by the microcomputer and for modifying the at least one input bit of the bank address to produce at least one modified bit;

a selection circuit for selecting any one of the at least one modified bit and at least one non-modified bit of the bank address and outputting the selected bit as at least a portion of the bank address signal to said access control means; and wherein the address of the register bank includes two bits, a least significant bit and a most significant bit and wherein the logic gate circuit comprises a first OR gate receiving at one input the least significant bit of the address held in the bank address register and at another input the least significant bit of the code of an instruction to be executed by the microcomputer and a second OR gate receiving at one input the most significant bit of the address held in the bank address register and at another input the least significant bit of the code of the instruction to be executed by the microcomputer, wherein the selection circuit comprises a first selection circuit receiving an output of the first OR gate and the least significant bit of the address held in the bank address register and for selecting any one thereof, and a second selection circuit receiving an output of the second OR gate and the most significant bit of the address held in the bank address register and for selecting any one thereof.

5. A microcomputer as claimed in claim 4, wherein the first and second selection circuits are responsive to the variation of a timing signal to select one of the signals input thereto.

6. A microcomputer which includes a plurality of register banks each consisting of a plurality of registers for containing data therein, a bank address register for holding the address of one of said register banks to be accessed and access control means responsive to a bank address signal for putting one of said register banks in accessible condition, said microcomputer comprising:
   a logic gate circuit receiving at one input at least one bit of the address held in the bank address register and at another input a predetermined portion of a code of an instruction to be executed by the microcomputer and for modifying the at least one input bit of the bank address to produce at least one modified bit;
   a selection circuit for selecting any one of the at least one modified bit and at least one non-modified bit of the bank address and outputting the selected bit as at least a portion of the bank address signal to said access control means; and
   wherein said logic gate circuit includes an exclusive OR gate and wherein the exclusive OR gate receives at one input a predetermined bit of the address held in the bank address register and at another input the least significant bit of the code of an instruction to be executed by the microcomputer,
   wherein the address of the register bank is expressed in two bits.

7. A microcomputer which includes a plurality of register banks each consisting of a plurality of registers for containing data therein, a bank address register for holding the address of one of said register banks to be accessed and access control means responsive to a bank address signal for putting one of said register banks in accessible condition, said microcomputer comprising:
   a logic gate circuit receiving at one input at least one bit of the address held in the bank address register and at another input a predetermined portion of a code of an instruction to be executed by the microcomputer and for modifying the at least one input bit of the bank address to produce at least one modified bit;
   a selection circuit for selecting any one of the at least one modified bit and at least one non-modified bit of the bank address and outputting the selected bit as at least a portion of the bank address signal to said access control means; and
   wherein said logic gate circuit includes an exclusive OR gate and wherein the exclusive OR gate receives at one input a predetermined bit of the address held in the bank address register and at another input the least significant bit of the code of an instruction to be executed by the microcomputer,
   wherein the selection circuit is responsive to a variation of a timing signal to select one of the two signals input thereto.

8. A microcomputer which includes a plurality of register banks each consisting of a plurality of registers for containing data therein, a bank address register for storing an address of one of said register banks to be accessed and control means responsive to a bank address signal for generating a selecting signal for putting one of said register banks in accessible condition, said control means comprising:
   first means for receiving an address stored in said address register;
   second means for receiving information indicating a different register bank to be selected;
   third means receiving said address and said information for generating a first selection signal on the basis of said address and said information when a logic signal for alternately designating data writing and data reading for said register banks by two different logic levels complementary to each other is at one logic level of said two logic levels and a second selection signal on the basis of only said address when said logic signal is at another logic level of said two levels, said first and second selection signals alternately constituting said selecting signal; and
   fourth means for applying said selecting signal to one of said register banks.

9. A microcomputer which includes a plurality of register banks each consisting of a plurality of registers for containing data therein, a bank address register for holding an address of one of said register banks to be accessed and access control means responsive to a bank address signal for putting one of said register banks in accessible condition, said microcomputer comprising:
   a logic gate circuit receiving at one input at least one bit of said address held in said bank address register and at another input a predetermined portion of a code of an instruction to be executed by said microcomputer and for modifying at least one input bit of said bank address to produce at least one modified bit;
   a selection circuit for selecting any one of said at least one modified bit and at least one non-modified bit of said bank address and outputting the selected bit as at least a portion of said bank address signal to said access control means;
   a selection circuit receiving any one of said at least one modified bit and at least one non-modified bit of said bank address for outputting, as at least a portion of said bank address signal to said access control means, said at least one modified bit when a logic signal for alternately designating data writing and data reading for said register banks by two different logic levels complementary to each other is at one logic level of said two logic levels and said at least one non-modified bit when said logic signal is at another logic level of said two levels; and
   wherein said address of said register bank includes two bits, a least significant bit and a most significant bit and wherein said logic gate circuit comprises a first OR gate receiving at one input said least significant bit of said address held in said bank address register and at another input said least significant bit of said code of said instruction to be executed by said microcomputer and a second OR gate receiving at one input said most significant bit of said address held in said bank address register and at another input said least significant bit of said code of said instruction to be executed by said microcomputer.

10. A microcomputer which includes a plurality of register banks each consisting of a plurality of registers for containing data therein, a bank address register for holding an address of one of said register banks to be accessed and access control means responsive to a bank address signal for putting one of said register banks in accessible condition, said microcomputer comprising:

a logic gate circuit receiving at one input at least one bit of said address held in said bank address register and at another input a predetermined portion of a code of an instruction to be executed by said microcomputer and for modifying said at least one input bit of said bank address to produce at least one modified bit;

a selection circuit receiving any one of said at least one modified bit and at least one non-modified bit of said bank address for outputting, as at least a portion of said bank address signal to said access control means, said at least one modified bit when a logic signal for alternately designating data writing and data reading for said register banks by two different logic levels complementary to each other is at one logic level of said two logic levels and said at least one non-modified bit when said logic signal is at another logic level of said two levels; and wherein said logic gate circuit includes an exclusive OR gate and wherein said exclusive OR gate receives at one input a predetermined bit of said address held in said bank address register and at another input a least significant bit of said code of said instruction to be executed by said microcomputer.

11. A microcomputer as claimed in claim 10, wherein the instruction code has a length of 8 bits.

12. A method of accessing a plurality of register banks within a computer, each register bank having a plurality of registers, said method comprising the steps of:

a) generating an bank address signal designating one of said plurality of register banks;

b) generating an instruction code for specifying an instruction to be executed by said computer, said instruction utilizing at least a first and second register of said register banks;

c) during a first portion of time during execution of said instruction code, modifying at least a portion of said bank address signal utilizing at least a portion of said instruction code for specifying one of said first and second registers, said first and second registers belonging to different register banks;

d) during a second portion of time during execution of said instruction code, specifying the other of said first and second registers by utilizing said bank address signal without modification by said instruction code; and e) accessing said specified first and second registers, whereby both said first and second registers may be accessed with a single instruction code and bank address.

13. A computer comprising:

a) a plurality of register banks, each register bank having a plurality of registers;

b) means for generating a bank address signal designating one of said plurality of register banks;

c) means for generating an instruction code for specifying an instruction to be executed by said computer, said instruction utilizing at least a first and second register of said register banks;

d) means, operative during a first portion of time during execution of said instruction code, for modifying at least a portion of said bank address signal utilizing at least a portion of said instruction code for specifying one of said first and second registers, said first and second registers belonging to different register banks;

e) means, operative during a second portion of time during execution of said instruction code, for specifying the other of said first and second registers by utilizing said bank address signal without modification by said instruction code; and f) means for accessing said specified first and second registers, whereby both said first and second registers may be accessed with a single instruction code and bank address.

14. A microcomputer comprising:

a plurality of register banks each consisting of a plurality of registers for containing data therein;

a bank address register for holding an address of one of said register banks to be accessed;

an instruction register for holding a code of an instruction to be executed by said microcomputer;

an exclusive-OR gate receiving at a first input one predetermined bit of an address held in said bank address register and at a second input a predetermined bit of said instruction code held in said instruction register for generating one modified bit for a modified bank address;

a selection circuit having an input connected to an output of said exclusive-OR gate to receive said one modified bit and another input connected to received said predetermined bit of said address held in said bank address register, said selection circuit being controlled by a timing signal to output, as one bit of a bank address signal, said one modified bit when a logic signal for alternately designating data writing and data reading for said register banks by two different logic levels complementary to each other is at one logic level of said two logic levels and said predetermined bit of said address held in said bank address when said logic signal is at another logic level of said two levels; and a decoder receiving said one bit of said bank address signal outputted from said selection circuit and another portion of said address held in said bank address register for establishing one of said register banks in an accessible condition.

15. A microcomputer as claimed in claim 14 wherein said bank address register is two bits and said exclusive-OR gate receives at the second input a least significant bit of said instruction code held in said instruction register.

* * * * *